(12) United States Patent
Quach et al.

(10) Patent No.: US 10,633,978 B2
(45) Date of Patent: Apr. 28, 2020

(54) DIRECTIONAL COOLING ARRANGEMENT FOR AIRFOILS

(71) Applicant: United Technologies Corporation, Farmington, CT (US)

(72) Inventors: San Quach, Southington, CT (US); Alberto A. Mateo, Vernon, CT (US); Jeffrey T. Morton, Manchester, CT (US); Jason Shenny, West Hartford, CT (US); Gregory Anselmi, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/419,137

(22) Filed: May 22, 2019

(65) Prior Publication Data
US 2020/0032656 A1    Jan. 30, 2020

Related U.S. Application Data

(63) Continuation of application No. 15/679,442, filed on Aug. 17, 2017, now Pat. No. 10,370,976.

(51) Int. Cl.
*F01D 5/18*  (2006.01)

(52) U.S. Cl.
CPC .......... *F01D 5/186* (2013.01); *F05D 2220/32* (2013.01); *F05D 2240/303* (2013.01);
(Continued)

(58) Field of Classification Search
CPC . F01D 5/18; F01D 5/182; F01D 5/186; F01D 5/187; F05D 2220/32;
(Continued)

(56) References Cited

U.S. PATENT DOCUMENTS

| 5,246,340 A | 9/1993 | Winstanley et al. |
| 5,263,820 A | 11/1993 | Tubbs |

(Continued)

FOREIGN PATENT DOCUMENTS

| EP | 16959264 | 5/2006 |
| EP | 2138675 | 12/2009 |

(Continued)

OTHER PUBLICATIONS

European Search Report for European Patent Application No. 18189576 completed Nov. 19, 2018.

*Primary Examiner* — Erick R Solis
(74) *Attorney, Agent, or Firm* — Carlson, Gaskey & Olds, P.C.

(57) ABSTRACT

An airfoil according to an example of the present disclosure includes, among other things, an internal wall and an external wall. The external wall defines pressure and suction sides between a leading edge and a trailing edge, and the airfoil section defines a mean camber line that extends between the leading and trailing edges to bisect a thickness of the airfoil section. A first cavity and a second cavity are separated by the internal wall. The second cavity is bounded by the external wall at the leading edge. At least one crossover passage within the internal wall connects the first cavity to the second cavity. The crossover passage defines a passage axis. The passage axis defines a passage angle with respect to the mean camber line such that the passage axis extends transversely from the mean camber line to intersect a surface of the second cavity.

20 Claims, 8 Drawing Sheets

(52) U.S. Cl.
CPC .... *F05D 2240/304* (2013.01); *F05D 2250/52* (2013.01); *F05D 2260/202* (2013.01)

(58) Field of Classification Search
CPC ........... F05D 2220/323; F05D 2240/24; F05D 2220/30; F05D 2260/202; F05D 2260/203
See application file for complete search history.

(56) References Cited

U.S. PATENT DOCUMENTS

| | | | |
|---|---|---|---|
| 5,271,715 A | | 12/1993 | Zelesky et al. |
| 5,356,265 A | * | 10/1994 | Kercher ................. F01D 5/186 416/97 R |
| 5,498,133 A | | 3/1996 | Lee |
| 5,538,394 A | * | 7/1996 | Inomata ................. F01D 5/187 415/115 |
| 5,700,131 A | * | 12/1997 | Hall ....................... F01D 5/187 416/97 R |
| 5,813,835 A | * | 9/1998 | Corsmeier ............. F01D 5/186 415/115 |
| 7,296,973 B2 | * | 11/2007 | Lee ........................ F01D 5/187 416/97 R |
| 7,722,326 B2 | | 5/2010 | Beeck et al. |
| 8,366,395 B1 | | 2/2013 | Liang |
| 8,657,576 B2 | | 2/2014 | Tibbott et al. |
| 8,944,763 B2 | * | 2/2015 | Lee ........................ F01D 5/087 416/97 R |
| 2008/0080979 A1 | | 4/2008 | Brassfield et al. |
| 2009/0162204 A1 | | 6/2009 | Aggarwala et al. |
| 2010/0254824 A1 | | 10/2010 | Naik et al. |
| 2013/0156602 A1 | | 6/2013 | Santoro et al. |
| 2014/0193273 A1 | | 7/2014 | Bommanakatte et al. |
| 2016/0010463 A1 | | 1/2016 | Quach |
| 2016/0024938 A1 | | 1/2016 | Slavens et al. |

FOREIGN PATENT DOCUMENTS

| | | |
|---|---|---|
| EP | 2752554 | 9/2014 |
| EP | 3032035 | 6/2016 |
| GB | 2460936 | 12/2009 |
| WO | 2009087346 | 7/2009 |

* cited by examiner

DIRECTIONAL COOLING ARRANGEMENT FOR AIRFOILS

CROSS REFERENCE TO RELATED APPLICATIONS

The present disclosure is a continuation of U.S. patent application Ser. No. 15/679,442, filed Aug. 17, 2017.

BACKGROUND

This disclosure relates to cooling for a component of a gas turbine engine, including a component having one or more impingement cooling features.

Gas turbine engines can include a fan for propulsion air and to cool components. The fan also delivers air into an engine core where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

SUMMARY

An airfoil according to an example of the present disclosure includes an internal wall and an external wall. The external wall defines pressure and suction sides between a leading edge and a trailing edge, and the airfoil section defines a mean camber line that extends between the leading and trailing edges to bisect a thickness of the airfoil section. A first cavity and a second cavity are separated by the internal wall. The second cavity is bounded by the external wall at the leading edge. At least one crossover passage within the internal wall connects the first cavity to the second cavity. The crossover passage defines a passage axis. The passage axis defines a passage angle with respect to the mean camber line such that the passage axis extends transversely from the mean camber line to intersect a surface of the second cavity.

In a further embodiment of any of the foregoing embodiments, the passage angle is between 45 degrees and 75 degrees.

In a further embodiment of any of the foregoing embodiments, the passage axis intersects the suction side.

In a further embodiment of any of the foregoing embodiments, the passage axis intersects the pressure side.

In a further embodiment of any of the foregoing embodiments, the airfoil section extends in a spanwise direction from a 0% span position to a 100% span position, and an outlet of the at least one crossover passage is defined at a span position that is between an 80% span position and the 100% span position.

In a further embodiment of any of the foregoing embodiments, the passage angle is between 15 degrees and 90 degrees.

A further embodiment of any of the foregoing embodiments includes a plurality of film cooling passages within the external wall that extend from a surface of the second cavity. The passage axis intersects the external wall at an intersection point, and the second cavity is free of any film cooling passages aft of the intersection point.

In a further embodiment of any of the foregoing embodiments, the mean camber line intersects the at least one crossover passage.

In a further embodiment of any of the foregoing embodiments, the passage axis intersects the suction side.

In a further embodiment of any of the foregoing embodiments, the at least one crossover passage extends between an inlet and an outlet, the outlet spaced apart from the external wall.

In a further embodiment of any of the foregoing embodiments, the airfoil is a turbine blade.

A casting core for an airfoil according to an example of the present disclosure includes a first portion that corresponds to a leading edge cavity of an airfoil and a second portion that corresponds to a second cavity of the airfoil. The airfoil defines a mean camber line that bisects a thickness of the airfoil between pressure and suction sides of the airfoil. A plurality of connectors couple the first portion and the second portion. The plurality of connectors correspond to a plurality of crossover passages of the airfoil. Each of the plurality of connectors define a passage axis. The passage axis of each of the plurality of connectors is arranged at a corresponding passage angle relative to the mean camber line. The passage angle is between 15 degrees and 90 degrees.

In a further embodiment of any of the foregoing embodiments, the mean camber line intersects at least one of the plurality of crossover passages.

In a further embodiment of any of the foregoing embodiments, the airfoil is a turbine airfoil.

A gas turbine engine according to an example of the present disclosure includes an array of airfoils circumferentially distributed about an engine axis. Each airfoil of the array of airfoils has an airfoil section that has pressure and suction sides between a leading edge and a trailing edge. The airfoil section defines a mean camber line that extends between the leading and trailing edges to bisect a thickness of the airfoil section. Facing pressure and suction sides of adjacent airfoils define a throat. The throat is defined as a minimum distance between the facing pressure and suction sides at a respective span position. An airfoil section includes an external wall and an internal wall. A first cavity and a second cavity are separated by the internal wall. The second cavity is bounded by the external wall at the leading edge. A plurality of crossover passages within the internal wall connects the first cavity to the second cavity. Each of the plurality of crossover passages define a passage axis. The passage axis of each of the plurality of crossover passages is arranged at a corresponding passage angle relative to the mean camber line such that the passage axis of each of the plurality of crossover passages intersects the external wall at a location between the throat and an aftmost location of the second cavity with respect to the engine axis.

In a further embodiment of any of the foregoing embodiments, the airfoil section extends in a radial direction with respect to the engine axis from a 0% span position to a 100% span position, and an outlet of each of the plurality of crossover passage is defined at a respective span position that is between a 80% span position and the 100% span position.

A further embodiment of any of the foregoing embodiments includes a plurality of film cooling passages within the external wall that extend from a surface of the second cavity. The passage axis of at least some of the plurality of crossover passages intersects the external wall at an intersection point, and the second cavity is free of any film cooling passages aft of the intersection point.

In a further embodiment of any of the foregoing embodiments, the passage axis of each of the plurality of crossover passages intersects the suction side.

The gas turbine engine as recited in claim 15, comprising a compressor section and a turbine section, with the array of airfoils located in at least one of the compressor section and the turbine section.

In a further embodiment of any of the foregoing embodiments, the array of airfoils are rotatable blades.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
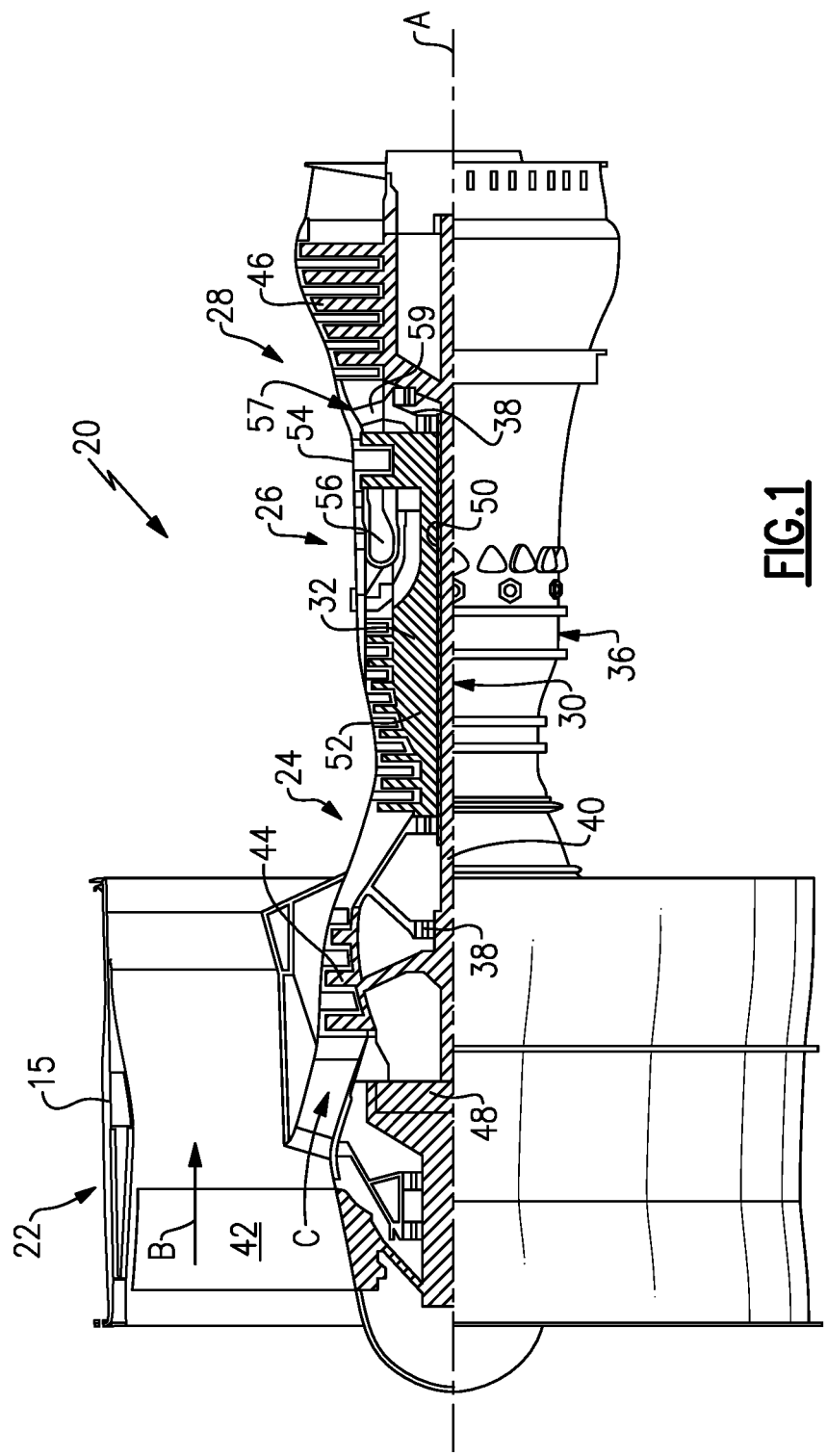
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \degree R)/(518.7\degree R)]^{0.5}$. The "Low corrected fan tip speed" as disclosed herein according to one non-limiting embodiment is less than about 1150 ft/second.

Figure 2:
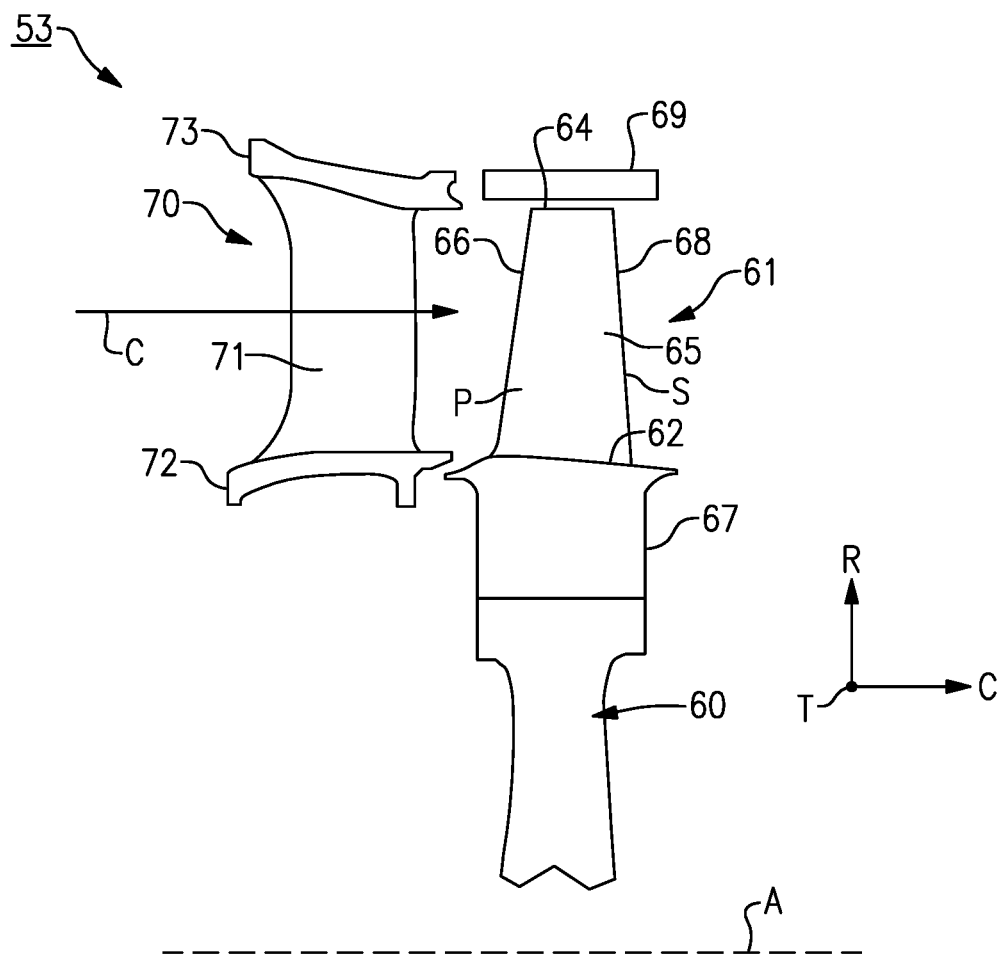
FIG. 2 schematically shows an airfoil arrangement for a section of a gas turbine engine.

FIG. 2 shows selected portions of a section 53 of a gas turbine engine, such as a portion of the compressor section 24 or the turbine section 28 of the engine 20 of FIG. 1. The section 53 includes a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. In this example, each airfoil 61 includes a platform 62 and an airfoil section 65 extending in a spanwise or radial direction R from the platform 62 to a tip 64. The airfoil section 65 generally extends in an axial or chordwise direction C between a leading edge 66 to a trailing edge 68, and in a circumferential or thickness direction T between suction and pressure sides S, P. A root section 67 of the airfoil 61 is mounted to the rotor 60, for example. It should be understood that the airfoil 61 can alternatively be integrally formed with the rotor 60, which is sometimes referred to as an integrally bladed rotor (IBR). The airfoil 61 is rotatable about the central axis A.

A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The section 53 includes multiple airfoils 61, vanes 70, and blade outer air seals 69 arranged circumferentially about the engine axis A. Although the exemplary cooling arrangements discussed in the disclosure primarily refer to a rotatable airfoil 61 or turbine blade, the teachings herein can also be utilized for another portion of the engine 20 including static airfoils such as vane 70, for example.

Figure 3:
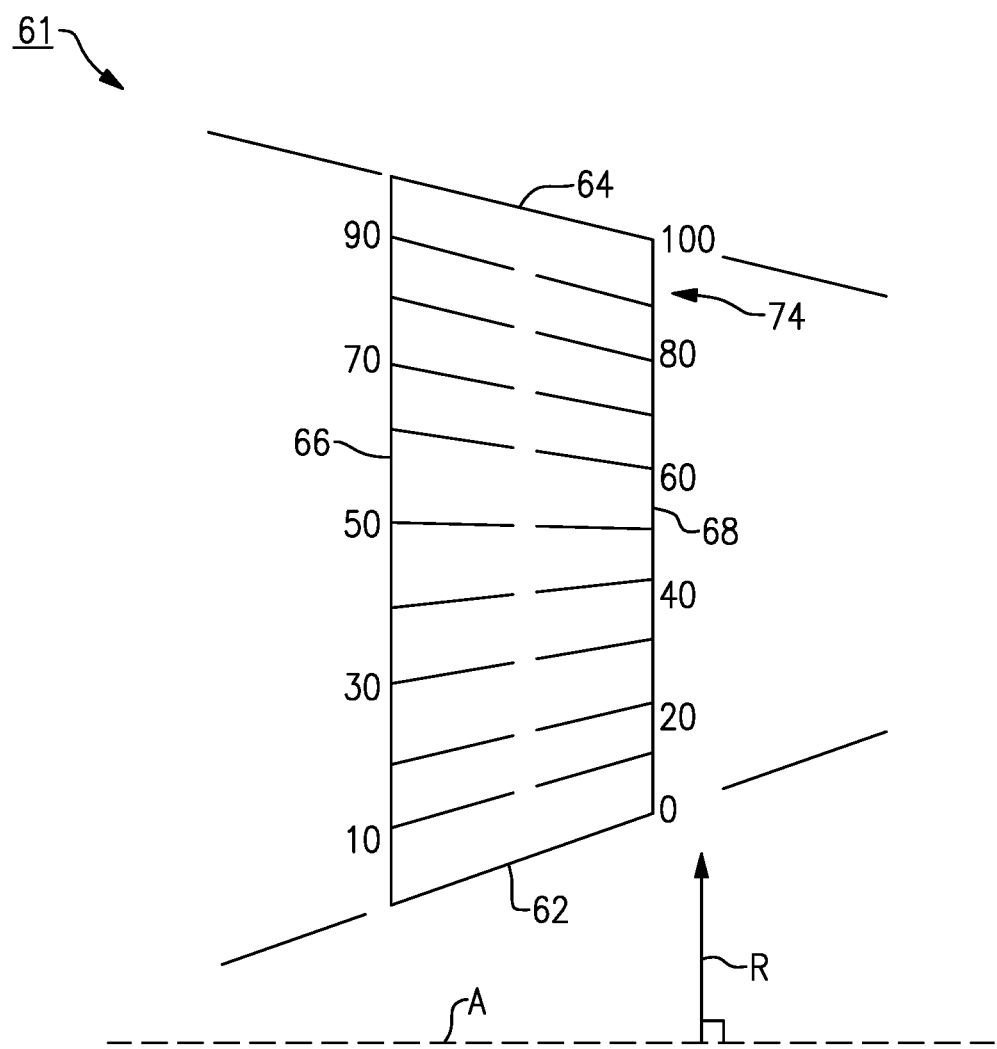
FIG. 3 is a schematic view of airfoil span positions.

Referring to FIG. 3, span positions are schematically illustrated from 0% to 100% in 10% increments to define a plurality of sections 74. Each section 74 at a given span position is provided by a conical cut that corresponds to the shape of segments of the core flow path C (FIG. 1), as shown by the large dashed lines. In the case of an airfoil 61 with an integral platform, the 0% span position corresponds to the radially innermost location where the airfoil 61 meets the fillet joining the airfoil section 65 to the platform 62. Span position may be relative to the platform 62, such as 0% span at the platform 62 and 100% span at the tip 64, for example. In the case of an airfoil 61 without an integral platform, the 0% span position corresponds to the radially innermost location where the discrete platform 62 meets the exterior surface of the airfoil section 65 (or the inner platform 72 of vane 70). A 100% span position corresponds to a section of the airfoil 61 at the tip 64 (or the outer platform 73 of vane 70).

Figure 4A:
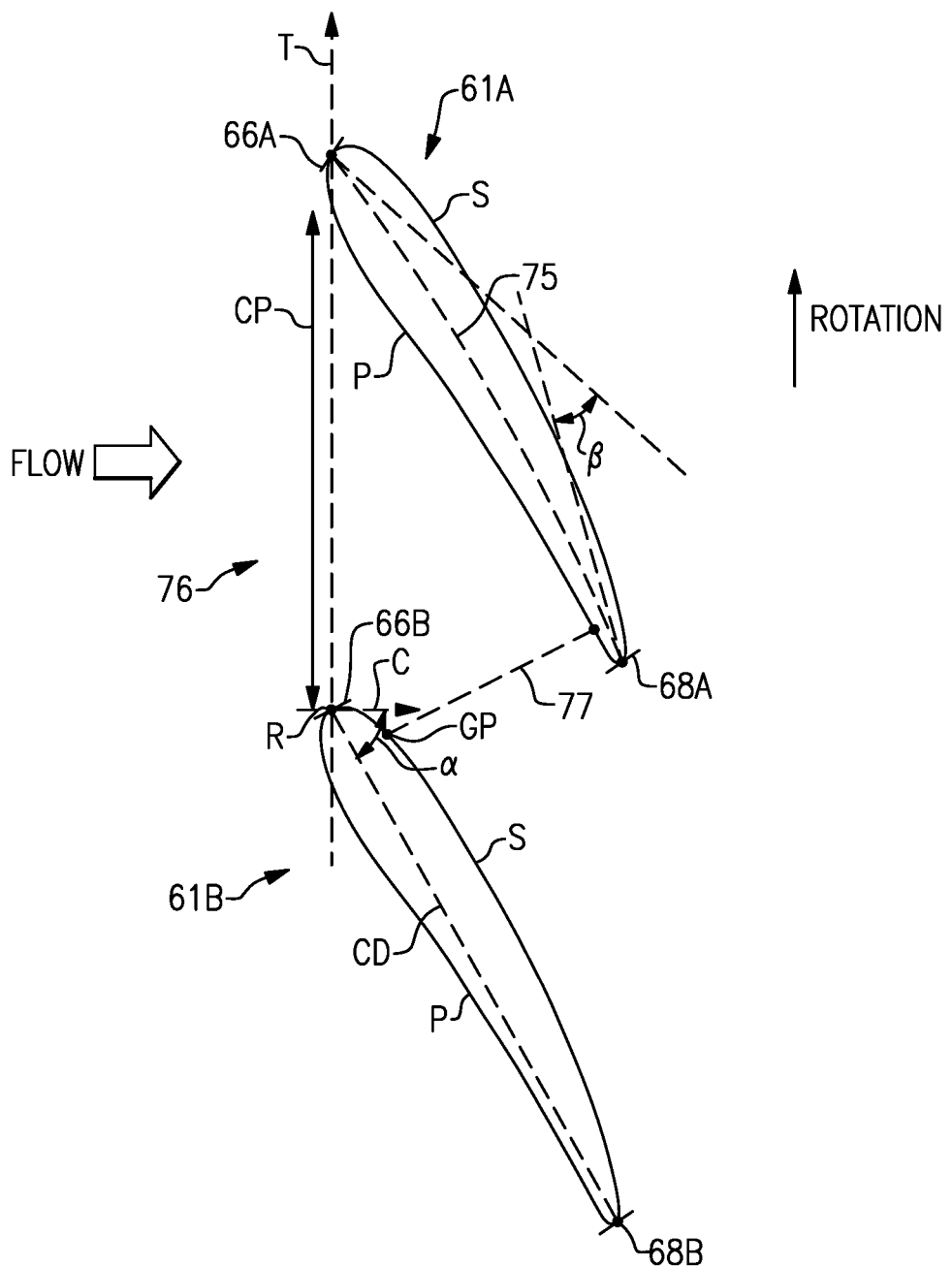
FIG. 4A illustrates a cross sectional view of adjacent airfoils according to a first embodiment.

FIG. 4A shows an isolated view of a pair of adjacent airfoils designated as leading airfoil 61A and following airfoil 61B at a first location, such as at a first span position or a location in the turbine section 28. The airfoils 61A, 61B of FIG. 4A may correspond to high lift airfoils, for example, which are discussed in more detail below. As shown, each airfoil 61A/61B is sectioned at a radial position between the root section 67 and the tip 64 (FIGS. 2 and 3). A chord dimension (CD), which is the length between the leading and trailing edges 66A/66B, 68A/68B of the airfoil 61A/61B, forms an angle, or stagger angle α, relative to the chordwise direction C or to a plane parallel to the engine's central longitudinal axis A (FIGS. 2 and 3). The chord dimension (CD) may vary along the span of the airfoil 61A/61B.

Each airfoil 61A/61B can have an asymmetrical cross-sectional profile characterized by a mean camber line 75. The mean camber line 75 extends between leading and trailing edges 66A/66B, 68A/68B to bisect a thickness of the airfoil 61 in the circumferential or thickness direction T.

Each airfoil 61A/61B defines a camber angle (β) defined by a tangential projection of the mean camber line 75 at the leading and trailing edges 66A/66B, 68A/68B. The camber angle (β) can differ at various span positions. For example, the camber angle (β) can decrease as span position increases. In some examples, the camber angle (β) is less than about 45 degrees, or more narrowly less than about 15 degrees, between the 80% span position and the 100% span position, which may be utilized with high lift airfoil geometries, for example. For the purposes of this disclosure, the term "about" means ±3% of the stated value unless otherwise disclosed.

Figure 4B:
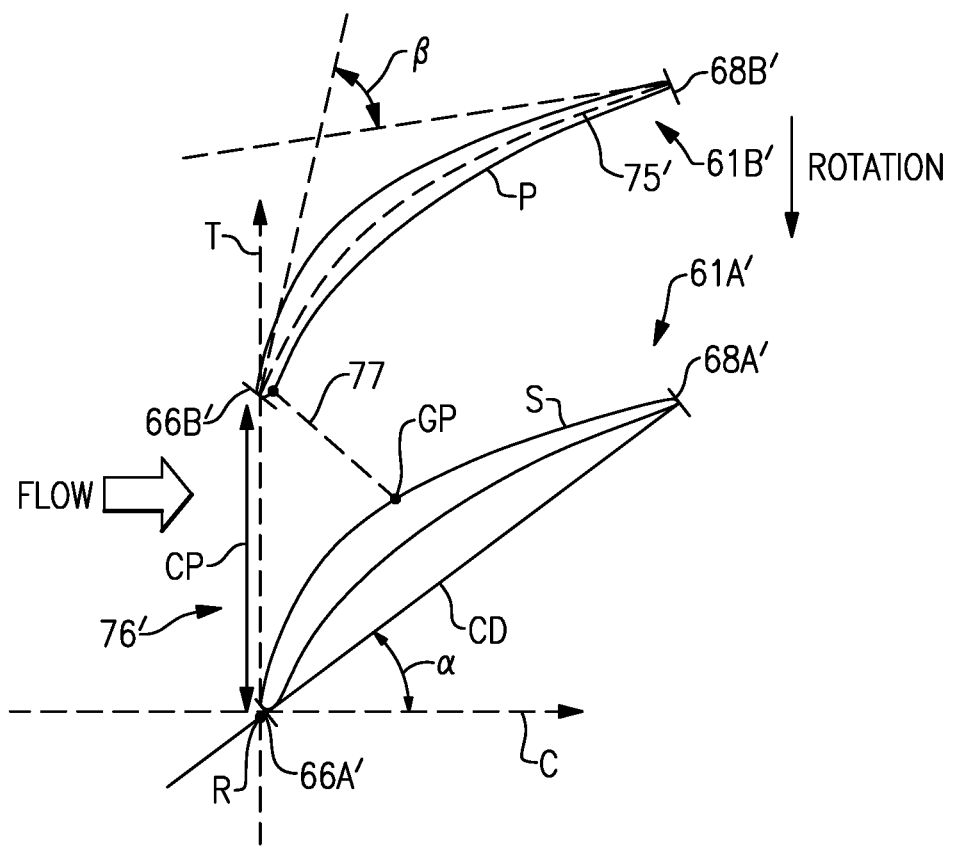
FIG. 4B illustrates a cross sectional view of adjacent airfoils according to a second embodiment.

The leading edges 66A, 66B or trailing edges 68A, 68B of the adjacent airfoils 61A, 61B are separated by a gap or circumferential pitch (CP) in the circumferential or thickness direction T to define an airfoil passage 76. Facing pressure and suction sides P, S of adjacent airfoils 61A, 61B define a throat 77. The throat 77 is defined as a minimum distance between the facing pressure and suction sides P, S of adjacent airfoils 61A, 61B at a respective span position (see FIG. 3). The throat 77 can include a component in the axial or chordwise direction C in addition to a component in the circumferential or thickness direction T. The minimum distance corresponds to a gauge point GP along surfaces of respective facing pressure and suction sides P, S of adjacent airfoils 61A, 61B. A location of the gauge point GP can vary depending on a geometry of the corresponding airfoils 61. FIG. 4B shows an isolated view of a pair of adjacent airfoils designated as leading airfoil 61A' and following airfoil 61B' at a second location, such as second span position, or at a location in the compressor section 24, for example.

In some examples, the airfoil 61 is a "high lift" airfoil. For the purposes of this disclosure, the term "high lift airfoil" means an airfoil design that has an airfoil shape that allows for reduced airfoil count due to its ability to extract more work than a conventional airfoil. High lift airfoils provide an improvement in efficiency and weight reduction. In using a high lift design, the airfoil stagnation point is shifted from a leading edge nose, where it is located on a conventional airfoil, to the pressure side towards the tip of the airfoil. In addition, the suction side gauge line, in which the gas Mach number is at the greatest, on a high lift airfoil can occur much closer to the leading edge nose than a conventional airfoil. An exemplary high lift airfoil is disclosed in U.S. patent application Ser. No. 14/767,768, entitled "Gas Turbine Engine High Lift Airfoil Cooling in Stagnation Zone," filed on Aug. 13, 2015 (now published as U.S. Publication No. 2016/0010463), the contents of which are incorporated herein by reference in their entirety.

Figure 6:
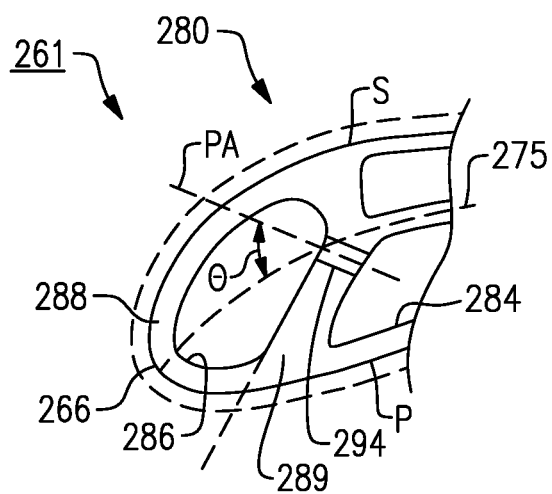
FIG. 6 illustrates a second exemplary cooling arrangement.
Figure 7:
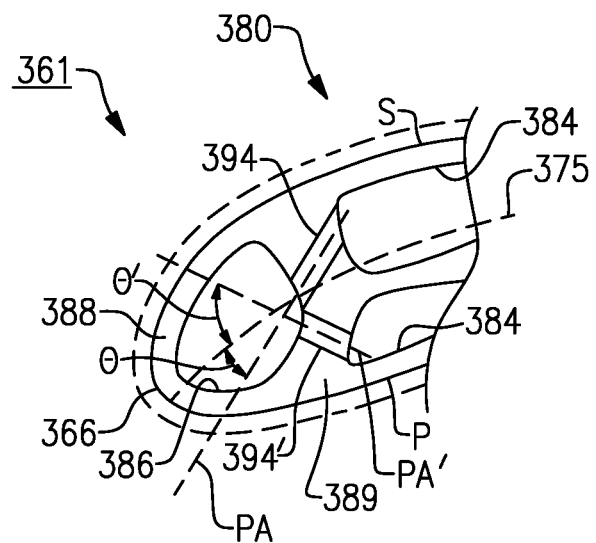
FIG. 7 illustrates a third exemplary cooling arrangement.

In examples, a cross section of the airfoil 61 at span position adjacent to the tip 64 are substantially thin and relatively long, and can have a relatively large amount of twist about a radial axis of the airfoil 61. For example, a maximum thickness of the airfoil 61 at span positions between 80% span and 100% span can be less than 25% of a maximum thickness of the airfoil 61 at 0% span, or more narrowly less than 10% of the maximum thickness of the airfoil 61 at 0% span. In other examples, the chord dimension (CD) of the airfoil 61 at span positions between 80% span and 100% span is greater than the chord dimension (CD) at 0% span, such as 125% or greater than the chord dimension (CD) at 0% span. Sections of example high lift airfoils are illustrated by airfoils 261 and 361 (FIGS. 6 and 7). A localized region of the airfoil 61 between the leading edge 66 and the gauge point GP, including the suction side S of high lift airfoils, can be susceptible to distress due to exposure of relatively high pressures and/or temperatures along the core flow path C (FIG. 1), including oxidation, erosion, burnthrough and thermal-mechanical fatigue.

Figure 5A:
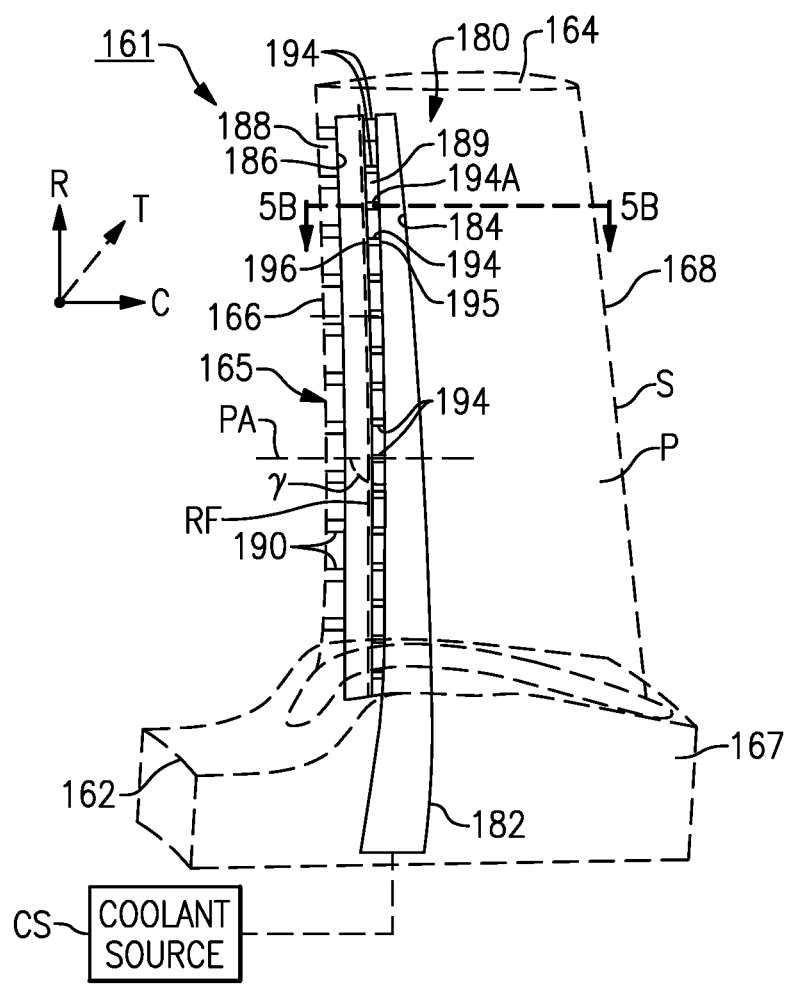
FIG. 5A illustrates a side view of a first exemplary cooling arrangement with an airfoil shown in phantom.
Figure 5B:
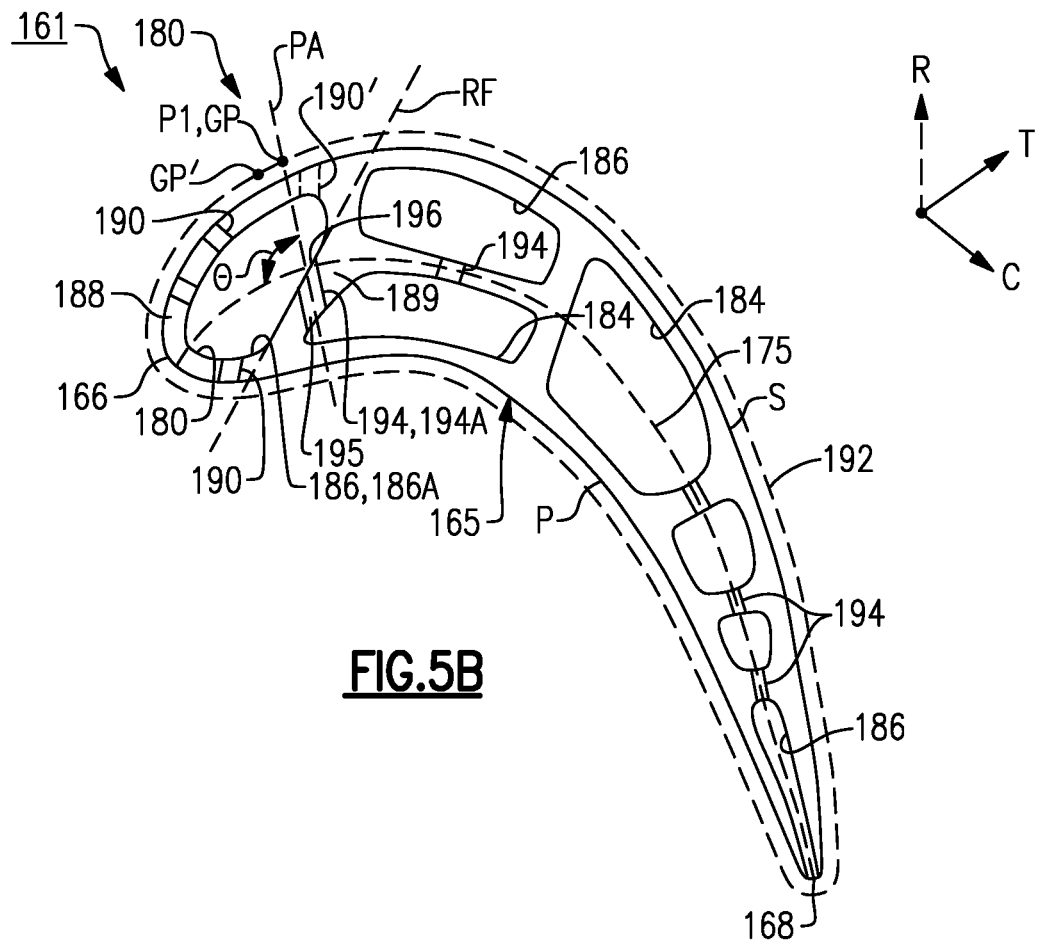
FIG. 5B illustrates a cross sectional view of the cooling arrangement of FIG. 5A along line 5B-5B.

FIGS. 5A and 5B illustrate an exemplary cooling arrangement 180 for an airfoil 161, such as the airfoil 61 of FIG. 2. Although the exemplary cooling arrangements discussed in the disclosure primarily refer to a compressor or turbine blade, the teachings herein can also be utilized for another portion of the engine 20 such as vane 70 of FIG. 2, for example.

At least one radial cooling passage 182 (only one shown for illustrative purposes) is provided between pressure and suction sides P, S in the thickness direction T. Each radial cooling passage 182 extends from a root section 167 through a platform 162 and toward a tip 164 to communicate coolant to various portions of the airfoil 161. Each radial cooling passage 182 is configured to receive coolant from a coolant source CS (shown schematically). Exemplary coolant sources CS can include bleed air from an upstream stage of the compressor section 24, bypass air from the bypass flow path B (FIG. 1), or a secondary cooling system aboard the aircraft, for example.

The cooling arrangement 180 includes a feeding cavity 184 (or one of a first cavity and a second cavity) and an impingement cavity 186 (or the other one of the first cavity and the second cavity) extending in the radial direction R (only one feeding cavity 184 and one impingement cavity 186 shown in FIG. 5A for illustrative purposes). One of the radial passages 182 or another source can communicate coolant to the feeding cavity 184 for delivery to the impingement cavity 186.

The feeding cavity 184 and impingement cavity 186 can be formed in various locations of the airfoil 161. In some examples, the impingement cavity 186 is bounded by an external wall 188 of the airfoil 161. The external wall 188 defines pressure and suction sides P, S between leading and trailing edges 166, 168 of the airfoil section 165. In the illustrative example of FIGS. 5A and 5B, the impingement cavity 186 is located at the leading edge 166. In another example, the impingement cavity 186 is located at the trailing edge 168 or between the leading and trailing edges 166, 168 as shown in FIG. 5B. The airfoil section 165 can include multiple feeding cavities 184 and/or impingement cavities 186 to provide cooling to various portions of the airfoil section 165, as illustrated in FIG. 5B.

The airfoil 161 may include one or more film cooling holes or passages 190 in fluid communication with the feeding cavities 184 and/or impingement cavities 186 to provide film cooling to various surfaces of the airfoil 161. The film cooling passages 190 may extend from a surface of the impingement cavity 186, for example. In some examples, the film cooling passages 190 are located within the external wall 188 at the leading edge 166, the trailing edge 168, or another location of the airfoil 161.

In some examples, the airfoil 161 includes a thermal barrier coating (TBC) or coating system 192 (shown in dashed lines in FIG. 5B) on an exterior surface of the airfoil section 165 to reduce heat transfer between the gas path and the airfoil section 165. The thermal barrier coating 192 can include, but is not limited to, a ceramic material such as yttria-stabilized zirconia (YSZ). The thermal barrier coating 192 can further include a bond layer to facilitate adherence to the substrate.

One or more crossover passages 194 are located within an internal wall 189 of the airfoil section 165, and can be arranged to provide directional or impingement cooling to relatively high heat load regions of the airfoil 161. The internal wall 189 is arranged to space apart or otherwise separate a respective feeding cavity 184 and impingement cavity 186. A portion of the airfoil section 165 defines a reference plane RF extending in the spanwise or radial direction R. The reference plane RF is defined along a surface of the internal wall 189 bounding the impingement cavity 186, and can be transverse to mean camber line 175 (FIG. 5B). The reference plane RF can be generally planar or can include a curvilinear component, for example. The reference plane RF can include an axial twist between platform 162 and the tip 164.

In some examples, the mean camber line 175 intersects one or more of the crossover passages 194 (e.g., crossover passage 194A of FIG. 5B). In the illustrative example of FIG. 5B, only one crossover passage 194A is located at the corresponding span position to feed impingement cavity 186A adjacent to the leading edge 166. In other examples, two or more crossover passages are located at the corresponding span position to feed impingement cavity adjacent to the leading edge (see, e.g., crossover passages 394, 394' of FIG. 7).

Each crossover passage 194 extends between an inlet port 195 and an outlet port 196 to connect a respective feeding cavity 184 and impingement cavity 186. Each of the crossover passages 194 defines a passage axis PA that intersects a surface of the impingement cavity 186 and/or the feeding cavity 184. The passage axis PA can be substantially linear or can include curvilinear portions between the inlet port 195 and outlet port 196, and can intersect the external wall 188 at locations along and/or aft of a leading edge region of the airfoil 161. For the purposes of this disclosure, the term "leading edge region" includes a region within ±15% of a partial leading edge cavity perimeter of the impingement cavity 186 at the leading edge 166, unless otherwise disclosed. The partial leading edge cavity perimeter of the impingement cavity 186 is defined as a perimeter of the impingement cavity 186 at the leading edge 166, exclusive of the internal wall or rib 189.

The crossover passages 194 are arranged such that coolant provided to the feeding cavity 184 is thereafter communicated to the impingement cavity 186. The coolant is communicated to the impingement cavity 186 to selectively provide impingement cooling to one or more portions of the external wall 188 of the airfoil 161. In the illustrated example, the airfoil 161 includes impingement cavity 186 that is bounded by external wall 188 at the leading edge 166. In some examples, one or more of the crossover passages 194 are arranged such that the respective outlet port 196 is spaced apart from the external wall 188 (e.g., crossover passage 194A of FIG. 5B).

The crossover passages 194 are shown in FIG. 5A as having a uniform distribution in the radial direction R. In other examples, the airfoil 161 includes a non-uniform distribution of at least some of the crossover passages 194 in the radial direction R. Although a particular quantity of crossover passages 194 is shown, the airfoil 161 can include fewer or more crossover passages 194.

Each passage axis PA of crossover passage 194 defines a first or radial angle (γ) (FIG. 5A) relative to the reference plane RF. In some examples, the radial angle (γ) is substantially perpendicular to the reference plane RF such that the crossover passage 194 is substantially parallel with the engine axis A. In other examples, the radial angle (γ) is transverse to the reference plane RF such that the crossover passage 194 is transverse to the engine axis A and slopes towards one of the platform 162 or the tip 164.

The passage axis PA can define a second or passage angle (θ) (FIG. 5B) with respect to the mean camber line 175 such that the crossover passage 194 ejects coolant onto surfaces of the impingement cavity 186 along the passage axis PA to cool a desired portion of the airfoil 161, such as portions of the external wall 188. The passage axis PA can include curvilinear portions between the inlet port 195 and outlet port 196, for example, but the passage angle (θ) is defined by a linear projection of the passage axis PA from the intersection of the passage axis PA and the reference plane RF at the outlet port 196. The mean camber line 175 can include a curvilinear portion that intersects the passage axis PA, but in this arrangement the passage angle (θ) is defined by a tangential projection of the curvilinear portion from the intersection of the passage axis PA and the mean camber line 175.

In the illustrated example of FIG. 5B, the passage angle (θ) of crossover passage 194A is defined such that the passage axis PA extends transversely from the mean camber line 175 to intersect a surface of the impingement cavity 186 and to intersect the suction side S of the external wall 188. The crossover passage 194 can be defined along various locations of the internal wall 189 or rib, and outlet port 196 can be defined along various locations relative to the reference plane RF, including toward the suction side S (e.g., crossover passage 294 of FIG. 6) or the pressure side P of the airfoil 161. In the illustrated example of FIG. 5B, at least some or each of the crossover passages 194 is arranged such that the respective passage axis PA intersects the suction side S of the external wall 188 (e.g., crossover passage 194A). In the illustrative example of FIG. 7, the passage angle (θ) is defined with respect to the mean camber line 375 such that the passage axis PA intersects a surface of the impingement cavity 386 and intersects the pressure side P of the external wall 388.

The passage angle (θ) can face toward the respective pressure or suction side P, S intersected by the passage axis PA (see, e.g., crossover passage 194A of FIG. 5B, and crossover passage 394 of FIG. 7). In some examples, the passage angle (θ) is between about 15 degrees and about 90 degrees, or more narrowly between about 45 degrees and about 75 degrees. In examples, the outlet port 196 of at least one, or more than one, of the crossover passages 194 is defined at a span position that is between a 80% span position and the 100% span position (see, e.g., crossover passage 194A), and can be arranged with respect to the mean camber line 175 utilizing any of the techniques disclosed herein.

The passage angle (θ) of at least some of the crossover passages 194 can change in the radial direction R. In some examples, the passage angle (θ) of at least some or each of the crossover passages 194 changes in the radial direction R such that the passage angles (θ) are generally progressively larger or smaller. In other examples, the crossover passages 194 are arranged such that the passage angles (θ) increase as span position increases for each, or at least some of, the crossover passages 194. In yet other examples, the crossover passages 194 are arranged such that the passage angles (θ) decrease as span position increases for each, or at least some of, the crossover passages 194.

The passage axis PA of at least some of the plurality of crossover passages 194 can intersect the external wall 188 at a respective intersection point P1 (FIG. 5B). The intersection point P1 may coincide with the respective gauge point GP, or may be defined aft of the gauge point GP' as illustrated by FIG. 5B. In some examples, the gauge point GP is located at about 50% to about 75% of the distance between the terminal portion of the leading edge 166 and the intersection point P1.

The passage axis PA of at least one, or each, of the crossover passages 194 is arranged at a corresponding passage angle (θ) such that the passage axis PA of the respective crossover passage(s) 194 intersects the external wall 188 at a location between the throat 77 (FIGS. 4A and 4B) and an aftmost location of the impingement cavity 186 with respect to the engine axis A (FIG. 1). In the illustrated example of FIG. 5B, the impingement cavity 186 is free of any film cooling passages 190 aft of the gauge point GP or the intersection point P1 for at least a respective span position of the airfoil section 165 (or substantially each span position). In alternative examples, the impingement cavity 186 includes at least one film cooling passage 190' (shown in dashed lines in FIG. 5B) aft of the gauge point GP and/or intersection point P1. The arrangement of the crossover passage(s) 194 relative to the mean camber line 175 utilizing the teachings herein can provide cooling augmentation to adjacent portions of the external wall 188 without the need for introducing film cooling passages downstream of the gauge point GP and/or intersection point P1 which can result in aerodynamic losses.

Figure 8:
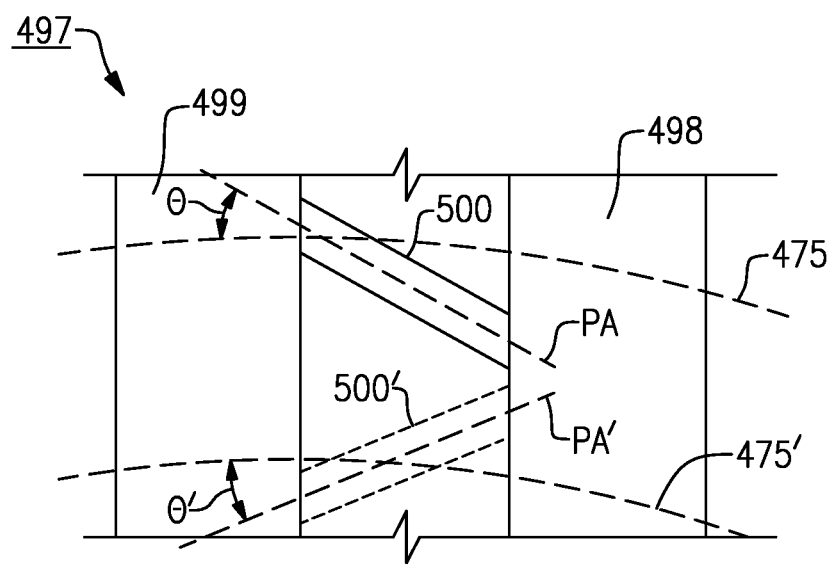
FIG. 8 illustrates a casting core for a cooling arrangement.

FIG. 8 illustrates a portion of a casting core 497. The casting core 497 can be utilized in a casting process to form the various arrangements of the crossover passages 194/294/394 of the cooling arrangements 180/280/380, for example. The casting core 497 includes a first portion 498 corresponding to the feeding cavity 184/284/384 and a second portion 499 corresponding to the impingement cavity 186/286/386, for example. In other examples, the first portion 498 corresponds to the impingement cavity 186/286/386, and the second portion 399 corresponds to the feeding cavity 184/284/384. One or more crossover connectors 500, 500', which may correspond to one or more of the crossover passages 194/294/394, couple or otherwise connect the first portion 498 and the second portion 499. Each of the crossover connectors 500, 500' is arranged relative to a mean camber line 475, 475' corresponding to the airfoils 161/261/361 to define a passage angle (θ), (θ'). The crossover connectors 500, 500' can be arranged to have a passage angle (θ), (θ') according to any of the corresponding crossover passages 194/294/394 disclosed herein.

The cooling arrangements 180/280/380 disclosed herein can improve cooling augmentation to the airfoil or vane, including areas susceptible to distress, and can improve airfoil durability and component life. The cooling arrangements 180/280/380 can also improve efficiency of the engine 20 due to reducing cooling supply demands, for example.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine, comprising:
   an airfoil section extending in a spanwise direction from a platform, the airfoil section having an internal wall and an external wall, the external wall defining pressure and suction sides between a leading edge and a trailing edge, and the airfoil section defining a mean camber line extending between the leading and trailing edges to bisect a thickness of the airfoil section;
   a first cavity and a second cavity separated by the internal wall, the second cavity bounded by the external wall at the leading edge;
   at least one crossover passage within the internal wall that connects the first cavity to the second cavity; and
   wherein the at least one crossover passage defines a passage axis, the passage axis defines a passage angle with respect to the mean camber line such that the passage axis extends transversely from the mean camber line to intersect a surface of the second cavity, and the passage angle is between 15 degrees and 90 degrees.

2. The airfoil as recited in claim 1, wherein the airfoil is a turbine airfoil, and the passage axis intersects the suction side or the pressure side.

3. The airfoil as recited in claim 2, wherein the airfoil section extends in the spanwise direction from a 0% span position to a 100% span position, and an outlet of the at least one crossover passage is defined at a span position that is between an 80% span position and the 100% span position.

4. The airfoil as recited in claim 2, comprising a plurality of film cooling passages within the external wall and extending from a surface of the second cavity, wherein the passage axis intersects the external wall at an intersection point, and the second cavity is free of any film cooling passages aft of the intersection point.

5. The airfoil as recited in claim 2, wherein the at least one crossover passage extends between an inlet and an outlet, the outlet spaced apart from the external wall.

6. The airfoil as recited in claim 2, wherein the passage angle is between 45 degrees and 75 degrees.

7. The airfoil as recited in claim 6, wherein the passage axis intersects the suction side and the pressure side.

8. The airfoil as recited in claim 6, wherein the airfoil section extends in the spanwise direction from a 0% span position to a 100% span position, and the airfoil section defines a camber angle of less than 45 degrees between the 80% span position and the 100% span position.

9. The airfoil as recited in claim 8, wherein the camber angle is less than 15 degrees between the 80% span position and the 100% span position.

10. The airfoil as recited in claim 9, wherein an outlet of the at least one crossover passage is defined at a span position that is between an 80% span position and the 100% span position.

11. The airfoil as recited in claim 9, comprising a plurality of film cooling passages within the external wall and extending from a surface of the second cavity, wherein the passage axis intersects the external wall at an intersection point, and the second cavity is free of any film cooling passages aft of the intersection point.

12. The airfoil as recited in claim 9, wherein the mean camber line intersects the at least one crossover passage.

13. The airfoil as recited in claim 9, wherein the passage axis intersects the suction side and the pressure side.

14. The airfoil as recited in claim 2, wherein the at least one crossover passage includes first and second crossover passages located at the same span position, the passage axis of the first crossover passage intersects the suction side, and the passage axis of the second crossover passage intersects the pressure side.

15. The airfoil as recited in claim 14, wherein the passage angle of the first crossover passage differs from the passage angle of the second crossover passage.

16. A gas turbine engine, comprising:
    a fan section including a fan;
    a compressor section;
    a turbine section that drives the fan, the turbine section including an array of airfoils circumferentially distributed about an engine axis, each airfoil of the array of airfoils including an airfoil section extending in a radial direction from a platform, the airfoil section having pressure and suction sides between a leading edge and a trailing edge, and the airfoil section defining a mean camber line extending between the leading and trailing edges to bisect a thickness of the airfoil section; and
    wherein airfoil section comprises:
       an external wall and an internal wall;
       a first cavity and a second cavity separated by the internal wall, the second cavity bounded by the external wall at the leading edge;
       a plurality of crossover passages within the internal wall and connecting the first cavity to the second cavity, each of the plurality of crossover passages defining a passage axis; and
       wherein the passage axis of each of the plurality of crossover passages is arranged at a corresponding passage angle relative to the mean camber line, and the passage angle is between 15 degrees and 90 degrees.

17. The gas turbine engine as recited in claim 16, wherein facing pressure and suction sides of adjacent airfoils define a throat, the throat defined as a minimum distance between the facing pressure and suction sides at a respective span position, and the passage axis of each of the plurality of crossover passages intersects the external wall at a location between the throat and an aftmost location of the second cavity with respect to the engine axis.

18. The gas turbine engine as recited in claim 17, wherein the array of airfoils are rotatable blades, and wherein the passage axis of each of the plurality of crossover passages intersects the suction side and the pressure side.

19. The gas turbine engine as recited in claim 17, wherein the airfoil section extends in the radial direction with respect to the engine axis from a 0% span position to a 100% span position, and an outlet of each of the plurality of crossover passage is defined at a respective span position that is between an 80% span position and the 100% span position.

20. The gas turbine engine as recited in claim 17, comprising a plurality of film cooling passages within the external wall and extending from a surface of the second cavity, wherein the passage axis of at least some of the plurality of crossover passages intersects the external wall at an intersection point, and the second cavity is free of any film cooling passages aft of the intersection point.

\* \* \* \* \*